(12) United States Patent
Mang et al.

(10) Patent No.: US 9,008,297 B2
(45) Date of Patent: Apr. 14, 2015

(54) METHODS, COMPUTER PROGRAM PRODUCTS, AND SYSTEMS FOR PROVIDING CALLED PARTY INITIATED PRIORITY MARKING

(75) Inventors: Xiaowen Mang, Morganville, NJ (US); Carolyn Roche Johnson, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1353 days.

(21) Appl. No.: 12/256,170

(22) Filed: Oct. 22, 2008

(65) Prior Publication Data

US 2010/0098233 A1    Apr. 22, 2010

(51) Int. Cl.
*H04M 3/42* (2006.01)
(52) U.S. Cl.
CPC ...... *H04M 3/42187* (2013.01); *H04M 2242/04* (2013.01); *H04M 2242/06* (2013.01)
(58) Field of Classification Search
CPC ..... H04M 3/42; H04M 3/42059; H04M 3/20; H04M 3/42068; H04Q 213/1325
USPC .......................... 379/201.07, 208.01
See application file for complete search history.

(56) References Cited

U.S. PATENT DOCUMENTS

| 5,604,491 | A  | * | 2/1997 | Coonley et al. ............. 340/7.59 |
| 6,789,107 | B1 | * | 9/2004 | Bates et al. .................. 709/206 |
| 2003/0112268 | A1 | * | 6/2003 | Wettach ....................... 345/731 |
| 2008/0020775 | A1 | * | 1/2008 | Willars ......................... 455/445 |
| 2008/0088475 | A1 | * | 4/2008 | Martin ..................... 340/870.02 |
| 2009/0285377 | A1 | * | 11/2009 | Sennett et al. ........... 379/201.04 |
| 2011/0034203 | A1 | * | 2/2011 | Holm et al. .................. 455/518 |

* cited by examiner

*Primary Examiner* — Rasha Al Aubaidi
(74) *Attorney, Agent, or Firm* — Cantor Colburn LLP

(57) ABSTRACT

Methods, computer program products, and systems for providing called party initiated priority marking are provided. The method includes receiving a request from a called party to mark a telephone call currently in session as a priority telephone call. The telephone call is initiated by a calling party and received by the called party. It is determined if the called party has authorization to mark the telephone call as a priority telephone call. The telephone call is marked as a priority telephone call if it is determined that the called party has authorization to mark the telephone call as a priority telephone call.

6 Claims, 3 Drawing Sheets

METHODS, COMPUTER PROGRAM PRODUCTS, AND SYSTEMS FOR PROVIDING CALLED PARTY INITIATED PRIORITY MARKING

BACKGROUND

Exemplary embodiments relate generally to assigning a priority to a telephone call, and more particularly to providing called party initiated priority marking.

The Government Emergency Telecommunications Service (GETS) is a White House directed emergency phone service provided by the National Communications System (NCS) in the Cyber Security & Communications Division, National Protection and Programs of the Department of Homeland Security. GETS supports federal, state, local, and tribal government, industry, and non-governmental organization (NGO) personnel in performing their National Security and Emergency Preparedness (NS/EP) missions.

GETS provides emergency access and priority processing in the local and long distance segments of the public switched telephone network (PSTN). GETS is intended to be utilized in emergency or crisis situations when the PSTN is congested and the probability of completing a telephone call over normal or other alternate telecommunication means has significantly decreased. GETS is important because of the increasing reliance on telecommunications. The economic viability and technical feasibility of such advances as nationwide fiber optic networks, high-speed digital switching, and intelligent features have revolutionized the way we communicate. This growth has been accompanied by an increased vulnerability to network congestion and system failures. Although backup systems are in place, disruptions in service can still occur (due to natural disasters, power outages, etc.)

Wireless Priority Service (WPS) is another priority calling capability that greatly increases the probability of telephone call completion when a NS/EP user is unable to complete emergency telephone calls while using their cellular telephone. WPS provides priority for emergency telephone calls through a combination of special cellular network features and the same high probability of completion (HPC) features used by GETS including originating radio channel priority, high probability of completion features, and terminating radio channel priority.

WPS addresses congestion in the local radio access channel (or cell), which is often the reason that cellular telephone calls cannot be made during heavy calling periods or when damage to network infrastructure occurs. WPS automatically provides priority access to local radio channels, placing outgoing WPS telephone calls in queue for the next available channel if a channel is not immediately available. Originating radio channel priority requires WPS feature activation on the calling cellular phone. Outgoing WPS telephone calls do not preempt telephone calls in progress nor do WPS users monopolize all available cellular resources.

The existing NE/SP services (GETS and WPS) described above are calling party oriented mechanisms. In other words, by dialing a designated number, the authorized calling party signals the nature of the telephone call session to the network. The telephone call is then treated appropriately with pre-defined rules while traversing through the network.

BRIEF SUMMARY

Exemplary embodiments include a method for providing called party initiated priority marking. The method includes receiving a request from a called party to mark a telephone call currently in session as a priority telephone call. The telephone call is initiated by a calling party and received by the called party. It is determined if the called party has authorization to mark the telephone call as a priority telephone call. The telephone call is marked as a priority telephone call if it is determined that the called party has authorization to mark the telephone call as a priority telephone call.

Additional exemplary embodiments include a system for providing called party initiated priority marking. The system includes a network control element and an egress network element connected to a called party device and to the network control element. The egress network element receives a request from a called party at the called party device to mark a telephone call currently in session as a priority telephone call. The egress network element also forwards the request to the network control element. The telephone call is initiated by a calling party and received by the called party. The network control element determines if the called party has authorization to mark the telephone call as a priority telephone call in response to receiving the request from the egress network element. The network control element marks the telephone call as a priority telephone call if it is determined that the called party has authorization to mark the telephone call as a priority telephone call.

Further exemplary embodiments include a computer program product, tangibly embodied on a computer readable medium, for providing called party initiated priority marking. The computer program product has instructions for causing a computer to execute a method, which includes receiving a request from a called party to mark a telephone call currently in session as a priority telephone call. The telephone call is initiated by a calling party and received by the called party. It is determined if the called party has authorization to mark the telephone call as a priority telephone call. The telephone call is marked as a priority telephone call if it is determined that the called party has authorization to mark the telephone call as a priority telephone call.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGS..

Figure 1:
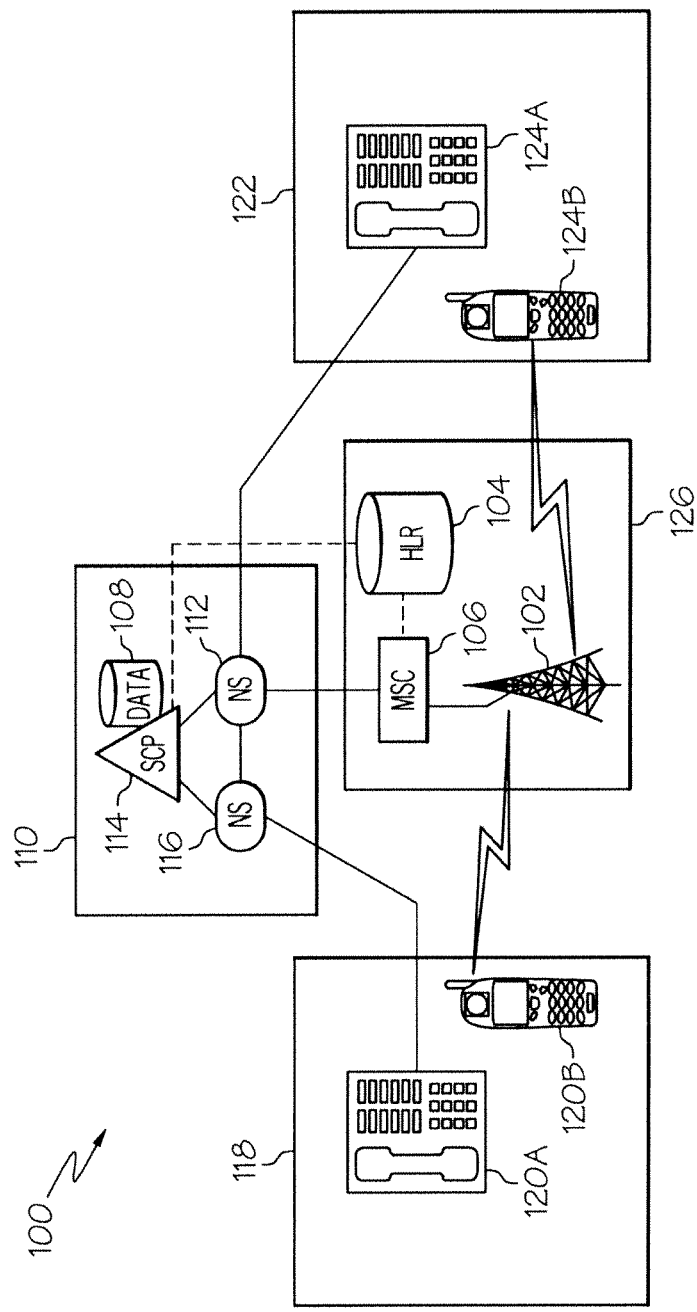
FIG. 1 illustrates a block diagram of a system for providing called party initiated priority marking that may be implemented by exemplary embodiments.

The detailed description explains the exemplary embodiments, together with advantages and features, by way of example with reference to the drawings.

DETAILED DESCRIPTION OF EXEMPLARY EMBODIMENTS

Exemplary embodiments include a called party mechanism in which a called party may set a priority marking for a telephone call that is already in progress (e.g., in session). For example, a telephone call may be received by a government agency with an authorized permission level for NE/SP telephone calls. Though the telephone call is originated by a caller without GETS/WPS status, judging by the nature of the telephone call content and the on-going situation associated with the calling party, the authorized called party can signal an ingress network element to mark the telephone call with a GETS/WPS priority setting. In exemplary embodiments, once the telephone call is marked as a priority telephone call, the telephone is treated as GETS/WPS inside the network. The priority marking may be revoked at any time during the telephone call by the called party, or the priority marking may be automatically terminated when the telephone call is terminated by either party.

As used herein the term "called party" refers to the party who is receiving the telephone call and the term "calling party" refers to the party who is initiating the telephone call.

Exemplary embodiments, referred to herein as called party initiated priority marking (CPIPM), broaden the application coverage of GETS/WPS services by allowing a called party to mark a telephone call as a priority telephone call. Exemplary embodiments may be utilized in certain disaster scenarios where it is important to maintain call connectivity and quality with the calling party. When both the calling party and the called party (e.g., a government agency) are mobile, CPIPM ensures the priority handover for radio access at both ends of the telephone call to avoid having the connectivity terminated during the handover process.

As voice over Internet protocol (VoIP) technology reaches its maturity, more and more circuit switched voice delivery networks are being replaced by packet switched VoIP technology. In VoIP, the priority treatment to special calls in session can only be applied toward packets with special marking. In conventional GETS/WPS calls, during the telephone call setup process, only the ingress network elements are signaled, by the calling party, to mark the packets. In exemplary embodiments of CPIPM described herein, both the ingress and egress network elements are signaled to mark the packets for the telephone call already in session so that excess packet loss for the session can be avoided under network congestion when using VoIP technology.

As used herein, the term "priority telephone call" refers to telephone calls that have been marked through some mechanism as a call that should be treated differently than other calls within the network. In general, priority telephone calls have higher levels of call completion and may have other high quality characteristics, even when the network is in a congested or failed state. Various mechanisms can be implemented inside a network. The functions of priority mechanisms are to provide preferential treatments to calls with high priority marking. Depending upon the technologies that are used to deliver the high priority call, priority marking can be done differently. In exemplary embodiments, priority marking is done through signaling the high priority call identification (ID) to the network elements. Network elements can check a special field inside the signaling message to determine whether the associated call should be given high priority treatment. In exemplary embodiments that utilize a packet switched network, the header of a high priority packet carries the information to the network elements for special treatment.

What kinds of mechanisms are implemented in a network is an engineering decision that a service provider has to make depending on what kinds of services are to be offered. For example, in a traditional circuit switched network, a call marked with high priority will be accepted while others are rejected when the number of concurrent calls in the system reaches a pre-defined level. Looking at another example, in a packet switched network, when packets arrive to a network element, packets that belong to a high priority VoIP call will be forwarded ahead of other packets so that high priority VoIP packets will experience the minimum queuing delay across that network element; or high priority packets will not be dropped while other packets are dropped when the queue length exceeds a pre-defined level so that the voice quality of high priority calls are guaranteed. Inside a service provider's network, traffic can be classified into multiple priority levels. What mechanisms are used and how each class of traffic is treated inside a service provider's network depends upon traffic engineering rules provisioned by the service provider. However, the quality of service expected by customers is governed by the service level agreements between contracted customers and the service provider.

FIG. 1 illustrates a block diagram of a communication system 100 that may be utilized to implement exemplary embodiments of CPIPM. Exemplary embodiments of the communication system 100 include a landline telephone network 110, a wireless telephone network 126, a communication device of a called party 122, and a communication device of a calling party 118. Exemplary embodiments of the landline telephone network 110 support landline telephone access and include telephone network switches 112, 116, a service control point (SCP) 114, and a SCP database 108. Exemplary embodiments of the wireless telephone network 126 support wireless telephone access and include a base transceiver system (BTS) 102, a mobile switching center (MSC) 106, and a home location register (HLR) 104. As depicted in FIG. 1, in exemplary embodiments the MSC 106 in the wireless telephone network 126 is connected to the network switch 112 in the landline telephone network 110. In addition, the HLR 104 is connected to the SCP 114. The HLR 104 is a location register to which the user identities of wireless cellular telephones 120B, 124B are assigned for record purposes. In addition, the HLR 104 may register subscriber information such as, but not limited to: profile information, current location, and authorization period.

As depicted in FIG. 1, in exemplary embodiments the communication device of the called party 122 is connected to the landline telephone network 110 via the telephone network switch 112. The communication device of the calling party 118 is connected to the landline telephone network 110 via the telephone network switch 116. The telephone network switch 112 is an example of an "ingress network element" because it is connected to the communication device of the calling party 118. The telephone network switch 116 is an example of an "egress network element" because it is connected to the communication device of the called party 122. The MSC 106 depicted in FIG. 1 is an example of both an ingress and egress network element because it is connected to both the communication device of the calling party 118 and the communication device of the called party 122.

Exemplary embodiments of the communication device of the called party 122 include a telephony device. Possible telephony devices include, among others, a telephone 124A attached to a telephone line in the landline telephone network 110, and the wireless cellular telephone 124B connected to the wireless telephone network 126 via the BTS.

Exemplary embodiments of the communication device of the calling party 118 include a telephony device. Possible telephony devices include, among others, a landline telephone 120A attached to a telephone line in the landline telephone network 110, and the wireless cellular telephone 120B connected to the wireless telephone network 126 via the BTS 102.

Exemplary embodiments of the landline telephone network 110 provide telephone communication services and may be, among others, an analog public switched telephone network (PSTN), or a digital network, such as voice over Internet protocol (VoIP). The landline telephone network 110 includes switches, such as the network switch 112, and the network switch 116 within the landline telephone network 110 to connect and route calls between the parties in a telephone conversation. Also included in the landline telephone network 110 is the SCP 114 which communicates with network switch 112, network switch 116, and other devices, which may be located outside of the landline telephone network 110, in order to provide requested telephone services. The SCP 114 is a processing element capable of executing service logic such as the CPIPM logic described herein. In addition, exemplary embodiments of the SCP 114 include the SCP database 108 for storing data, such as user authorization data to verify that a called party is authorized to invoke the CPIPM service.

In exemplary embodiments, there are at least four combinations of telephone call flows that may be implemented: landline to landline (L-L), landline to mobile (L-M), mobile to landline (M-L), and mobile to mobile (M-M). Exemplary embodiments described herein implement CPIPM for any of these telephone call flows.

Figure 2:
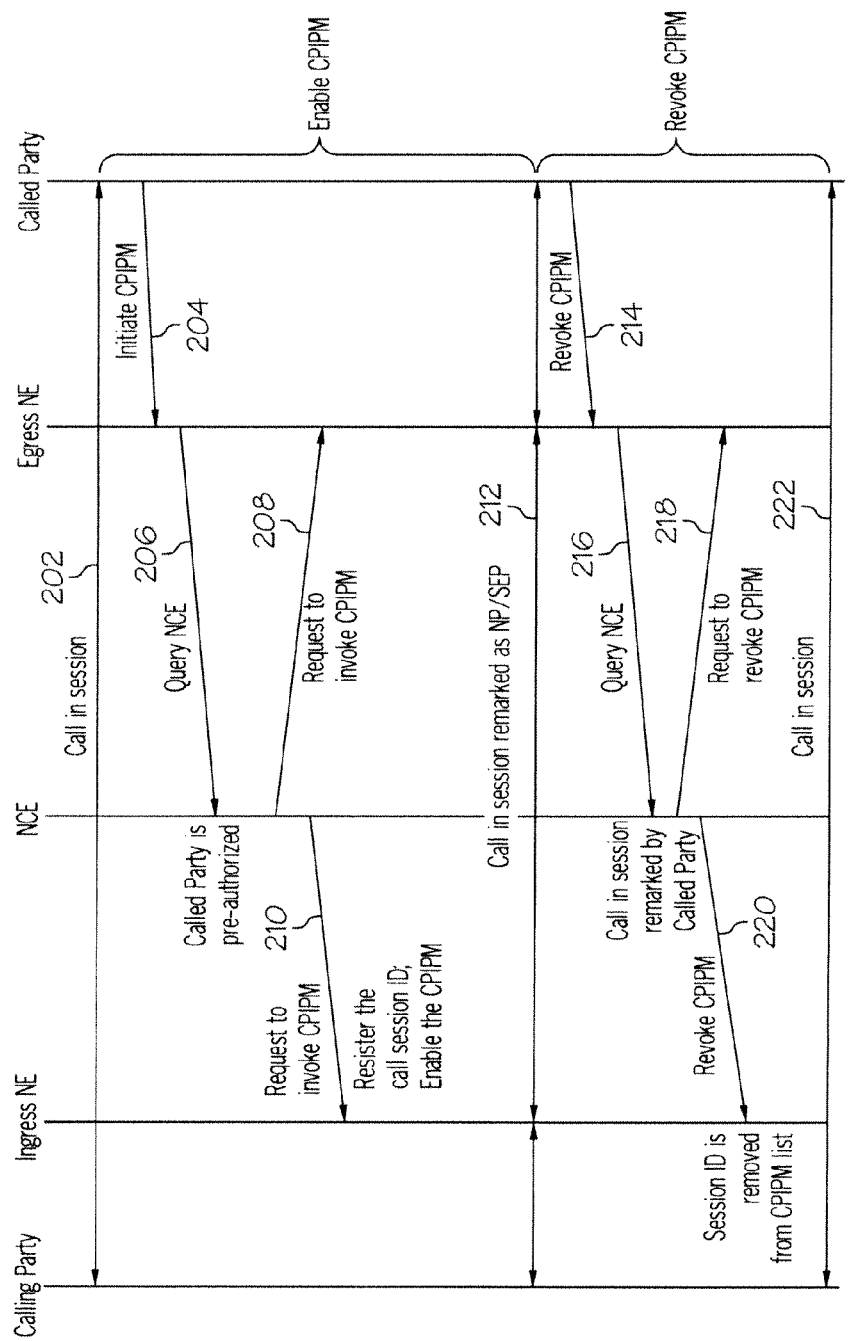
FIG. 2 illustrates a process flow for enabling and revoking called party initiated priority marking that may be implemented by exemplary embodiments.

FIG. 2 illustrates elements in a telephone communication system, such as the telephone communication system 100 depicted in FIG. 1. The horizontal lines in FIG. 2 represent the messaging between the elements to perform a basic telephone call flow process for implementing exemplary embodiments of CPIPM. In the exemplary embodiments described herein in reference to FIGS. 2 and 3, the calling party in FIG. 2 utilizes the calling party landline telephone 120A in FIG. 1 as the calling party device, and the called party in FIG. 2 utilizes the called party landline telephone 124A in FIG. 1 as the called party device. Thus, exemplary embodiments are described in terms of a L-L telephone call flow, however other call flows (e.g., L-M, M-L, and M-M) may also be implemented by exemplary embodiments. In the example L-L telephone call flow scenario described herein, the ingress network element in FIG. 2 is implemented by the network switch 116 in FIG. 1, the egress network element in FIG. 2 is implemented by the network switch 112 in FIG. 1, and the network control element (NCE) depicted in the FIG. 2 is implemented by the SCP 114 in FIG. 1.

In exemplary embodiments, a telephone call is in session 202 between a calling party at the calling party landline telephone 120A and a called party at the called party landline telephone 124A. In exemplary embodiments, the called party requests CPIPM by dialing a designated sequence of numbers (e.g., a PIN). In alternate exemplary embodiments, if the called party answers the telephone call using a data capable called party device, such as a computer, the called party requests CPIPM by entering a designated password into the data capable device. The request to initiate CPIPM 204 is relayed upstream from the called party landline telephone 124A to the egress network switch 112. In alternate exemplary embodiments, if the called party is a wireless cellular telephone, such as the wireless cellular telephone 124B, then the request to initiate the CPIPM service 204 is relayed upstream to an egress network element that is implemented by the MSC 106.

The network switch 112 sends a query 206 to the SCP 114 in response to receiving the initiation request from the called party landline telephone 124A. The SCP 114 then determines if the called party has access to invoke CPIPM. In exemplary embodiments, authorized users and their PIN numbers are stored in the SCP database 108 (also referred to herein as an "authorization database") and the SCP 114 queries the SCP database 108 to determine if the called party has access to CPIPM. In exemplary embodiments if one or both of the PIN/password and called party telephone number is located in the authorization database, then the called party is authorized to mark the telephone call as a priority telephone call. In alternate exemplary embodiments, such as the wireless telephone network 126, the NCE is implemented by the HLR 104. In other alternate embodiments, such as a VoIP network, the NCE is implemented by an application server.

If the CPIPM logic located on the SCP 114 determines that the called party is a pre-authorized user of CPIPM, then the SCP 114 routes a request to invoke CPIPM 210 to the ingress network switch 116 and routes a request to invoke CPIPM 208 to the egress network switch 112. In response to receiving the request, the ingress network switch 116 and the egress network switch 112 mark the telephone call as a priority telephone call by registering the session identifier of the telephone call and enabling CPIPM. In exemplary embodiments, to register the session identifier of a high priority call, a new data structure is created to track call priority status at related network elements including ingress, egress and control elements. As a result, the call identifiers of high priority calls will be associated with high priority markings. The CPIPM logic then will mark traffic of the associated call with a high priority marking to enable preferential treatments for the call across network elements along the call path. For example, if it is an IP network, the packets of a high priority call will be marked and are eligible to receive better treatment inside the network depending on the state of the network. In exemplary embodiments, the priority marking is changed to GETS/WPS for the newly registered telephone call in session. In exemplary embodiments, this results in the telephone call in session being marked as NP/SEP 212. Thus, the telephone call in session will receive the same treatment at ingress and egress network elements as other GETS/WPS calls.

In exemplary embodiments, where the called party device is a landline telephone, the ingress network element is implemented by a circuit switched border element or by a packet switched border element. In alternate exemplary embodiments, if the calling party is a mobile user, the ingress network element is the physical equipment where radio channel access control functions reside. In Global System for Mobile Communications (GSM) technology the ingress network element may be implemented by the BSC. In Universal Traffic Management System (UTMS) technology the ingress network element may be implemented by a radio network controller (RNC).

In exemplary embodiments, the called party may also revoke the priority marking from the telephone call in a variety of manners, such as keying in a designated code sequence into the called party landline telephone 124A. The request to revoke CPIPM 214 is relayed upstream from the called party landline telephone 124A to the egress network switch 112. The network switch 112 sends a query 216 to the SCP 114 in response to receiving the revoke request from the called party landline telephone 124A. The SCP 114 then determines if the called party has access to revoke CPIPM by querying the authorization database. If the CPIPM logic located on the SCP 114 determines that the called party has access to revoke CPIPM, then the SCP 114 routes a request to revoke CPIPM 220 to the ingress network switch 116 and routes a request to revoke CPIPM 218 to the egress network switch 112. In response to receiving the request, the ingress and egress network switch 116 disable CPIPM by revoking the priority marking from the telephone call. In exemplary embodiments, the ingress network switch 116 and the egress network switch 112 remove the session identifier from a list of CPIPM sessions. In exemplary embodiments, to keep track of which call sessions are marked as high priority because of CPIPM a data record, such as a CPIPM list, is maintained at related network elements. The entries of the list are the session identifiers of those calls that are marked as high priority by CPIPM logic. The session identifier is removed from the CPIPM list if the call status has changed. The call status can be changed because the call is terminated or the CPIPM marking is revoked by the called party. In exemplary embodiments, revoking the priority marking does not result in the telephone call being terminated and the telephone call remains in session 222 without a priority marking.

In exemplary embodiments, the telephone call with the priority marking may be terminated at any time by either the calling party or the called party. Upon telephone call termination, the priority states, or CPIPM states, associated with the telephone call session are de-registered from the ingress and egress network elements. Calling party's subsequent telephone calls have no memory of the priority marking, or CPIPM functions.

Figure 3:
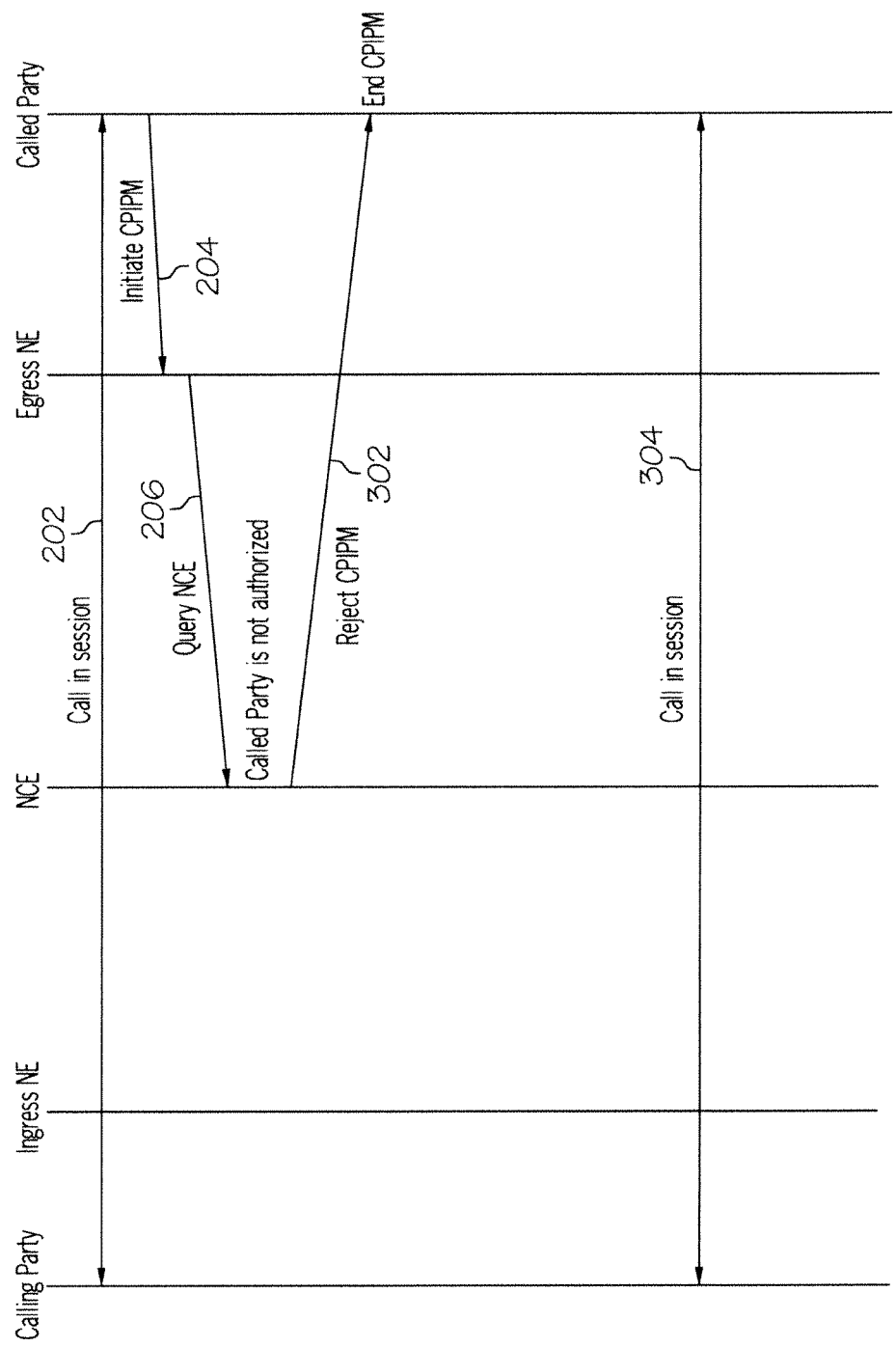
FIG. 3 illustrates a process flow that may be implemented by exemplary embodiments when called party initiated priority marking is not successfully invoked.

FIG. 3 depicts processing that will occur in exemplary embodiments, if the called party is not authorized to mark the telephone call as a priority telephone call. The SCP 114 sends a message that CPIPM access has been rejected 302 to the egress network switch 112 and on to the called party landline telephone 124A. The telephone call remains in session 304 but it is not marked as a priority telephone call.

In exemplary embodiments, CPIPM allows both ingress and egress network elements to set the telephone call priority so that the telephone call will receive priority treatment at the network access points and as well as inside the carrier network.

As described above, exemplary embodiments can be in the form of computer-implemented processes and apparatuses for practicing those processes. Exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the present disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings of the present disclosure without departing from the essential scope thereof. Therefore, it is intended that the present disclosure not be limited to the particular exemplary embodiments disclosed for carrying out this invention, but that the present disclosure will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for providing a called party initiated priority marking system, the system comprising:

a network control element;

an egress network element connected to a called party device and to the network control element, the egress network element receiving a request from a called party at the called party device to mark a telephone call currently in session with a calling party with priority marking as a priority telephone call and forwarding the request to the network control element, the telephone call initiated by the calling party and received by the called party;

the network control element receiving the request from the egress network element, determining if the called party has authorization to mark the telephone call as a priority telephone call and marking the telephone call as a priority telephone call if it is determined that the called party has authorization to mark the telephone call as a priority telephone call, wherein the determining includes accessing an authorization database and searching for an identifier associated with the called party in the authorization database;

the network control element treating the telephone call currently in session as a priority telephone call with respect to other telephone calls currently in session, the treating the telephone call currently in session as a priority telephone call including meeting a voice quality for the telephone call currently in session; and an ingress network element connected to the network control element and to a calling party device utilized by the calling party to initiate the telephone call, wherein the marking the telephone call as a priority telephone call includes notifying the ingress network element and the egress network element of the marking the telephone call as a priority telephone call;

wherein the egress network element further receives a request from the called party to revoke the priority marking from the telephone call and forwards the request to the network control element, and the network control element further receives the request to revoke the priority marking from the telephone call, the network control element determining if the called party has authorization to revoke the priority marking from the telephone call and revoking the telephone call as a priority telephone call upon determining that the called party has authorization to revoke the priority marking from the telephone call, wherein the determining if the called party has authorization to revoke the priority marking from the telephone call includes accessing the authorization database and searching for the identifier associated with the called party in the authorization database and revoking the priority marking from the telephone call in response to receiving the request to revoke the priority marking;

the network control element notifying the ingress network element of revocation of the priority marking from the telephone call upon determining the called party has authorization to revoke the priority marking from the telephone call;

the ingress network element revoking the priority marking from the telephone call in response to receiving notification from the network control element to revoke the priority marking.

2. The system of claim 1 wherein the telephone call is received by the called party via a landline telephone.

3. The system of claim 1 wherein the telephone call is received by the called party via a wireless telephone.

4. The system of claim 1 wherein the network control element is a service control point (SCP).

5. The system of claim 1 wherein the network control element is a home location register (HLR).

6. The system of claim 1 wherein the network control element is an application server.

* * * * *